(No Model.)
J. R. AYERS.
PEANUT PLANTER.
No. 261,418. Patented July 18, 1882.
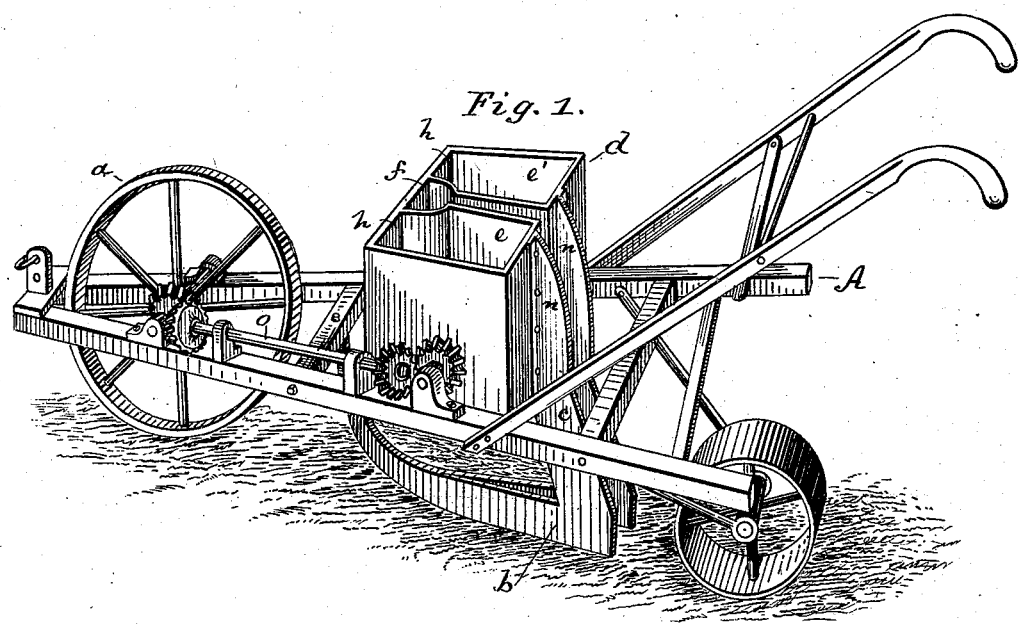
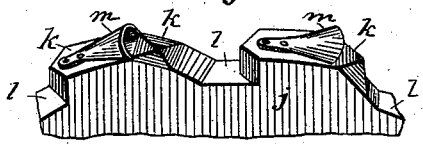
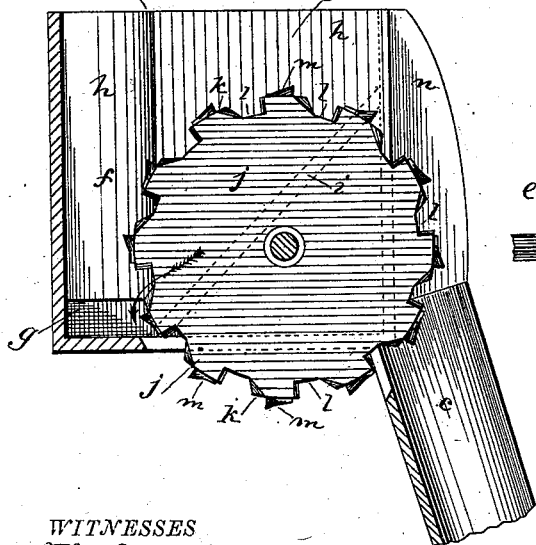
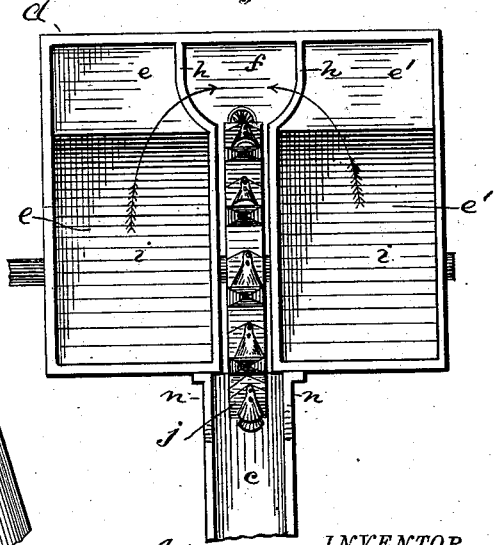
WITNESSES
Thos. Houghton.
Fred. G. Dieterich.
INVENTOR
James R. Ayers
By Munn & Co.
Attorneys

UNITED STATES PATENT OFFICE.

JAMES R. AYERS, OF PETERSBURG, VIRGINIA.

PEANUT-PLANTER.

SPECIFICATION forming part of Letters Patent No. 261,418, dated July 18, 1882.

Application filed February 23, 1882. (No model.)

*To all whom it may concern:*

Be it known that I, JAMES R. AYERS, of Petersburg, in the county of Dinwiddie and State of Virginia, have invented a new and useful Improvement in Peanut-Planters, of which the following is a full, clear, and exact description, reference being had to the annexed drawings, forming part of this specification.

The object of this invention is to provide a peanut-planter by which peanuts can be dropped accurately without danger of bruising or breaking the skins; and the invention consists of a hopper and feed-wheel of peculiar construction and means for operating the wheel, as hereinafter described.

In the accompanying drawings, Figure 1 is a perspective view of my improved peanut-planter. Fig. 2 is a sectional view of the hopper. Fig. 3 is a plan view of the hopper, and Fig. 4 is a detail showing a portion of the periphery of the feed-wheel.

The frame A, which is to be made of any suitable form, is supported at its forward end upon the driving-wheel $a$. At the center of the frame, between the two wheels, is secured an opener, $b$, the rear end of which terminates in an inclined chute, $c$, communicating with the hopper $d$. The hopper $d$, which may be of any suitable shape, is preferably formed with two side compartments, $e$ $e'$, arranged side by side at an interval apart, and an intervening compartment, $f$, placed near the forward ends of the side compartments, and communicating therewith through openings $g$ at the bottom of the walls $h$. The compartment $f$ is semicircular in form and communicates with the space intervening between the side compartments, while the openings $g$ are formed by having the walls $h$, where they are curved to form the compartment $f$, extend only to within two or three inches of the bottom of the side compartments. The peanuts are to be put into the side compartments, and, owing to the inclined bottoms $i$ of these compartments, they will slide down through the openings $g$ into the compartment $f$, where they will be taken up by the feed-wheel $j$. The feed-wheel $j$, which is journaled to rotate in the space between the side compartments, $e$ $e'$, is made of such a thickness as to fill the said space, and is provided with alternate projections $k$ and recesses $l$, formed on or about its periphery. On the projections $k$ are secured cups or scoops $m$, having their cavities of a gradually-narrowing diameter from rim to bottom, of suitable size for holding one peanut, and to prevent a larger number of peanuts from being taken up by the wheel the wall of the recess $l$ in front of the cup is inclined toward the cup and the projection $k$ at the end nearest to the inclined wall is beveled on one or each side, so that any surplus quantity of nuts will drop back as the cup is carried up by the wheel. When the cup enters the space between the side compartments from the compartment $f$ the walls of said compartments will prevent the peanut from dropping out of the recess $l$, into which it will have rolled, until the cup shall have been carried beyond the said walls over the chute $c$. The wall of the recess $l$ behind the cup is radial, and is beveled at one or both sides to facilitate the escape of the nut from the recess when the latter is over the chute $c$. The flanges $n$, at the rear of the hopper, are designed to insure the peanut entering the chute, by which it is to be conveyed to the furrow.

The construction above described is of great importance in a peanut-planter, for the reason that the irregular shape of the peanut would tend to wedge it in the cup if the latter were constructed like an ordinary seed-cup. It will be seen that the cup in this case is adapted to lift a single nut at a time and to hold it loosely until the force of gravity begins to operate to throw it forward into a recess, and the recess catches the nut and holds it still more loosely until it is in proper position for being dropped. With this construction the nut cannot be wedged in the cup or recess, and consequently the dropping will be accurate. Another advantage is that the hull or skin of the nut, which is tender, will not be crushed in this wheel.

To prevent the escape of peanuts at the bottom of compartment $f$, where the cups enter, a slotted piece of leather, rubber, or other elastic material is to be secured therein in such manner that the cups may readily force their way through it.

The feed-wheel is to be operated by any suitable gearing with the driving-wheel $a$. I prefer to connect them by a shaft, $o$, having bevel-pinions at the ends which mesh with pinions on the shafts of the two said wheels.

Having thus described my invention, what I claim as new, and desire to secure by Letters Patent, is—

1. The peanut-planter having the feed-wheel provided with alternate projections and recesses on its periphery and cups arranged on the projections, in combination with the hopper having side compartments and an intermediate compartment communicating therewith, said intermediate compartment having an opening for admitting the wheel, substantially as shown and described.

2. The feed-wheel having alternate projections and recesses formed on its periphery, and cups secured to the projections, having their cavities of a gradually-narrowing diameter from rim to bottom, substantially as shown and described, whereby only one peanut shall be taken up at a time by a cup and that shall readily be discharged therefrom by gravity.

3. The feed-wheel having alternate projections and recesses formed on its periphery, and having cups constructed with conical cavities, as shown, secured to the projections, and one wall of each recess made radial and beveled laterally at the rear end of a cup and the other inclined toward the mouth of a cup and beveled laterally at the upper end, substantially as shown and described, whereby the peanut shall be assisted in passing from the cup into the recess in front thereof and be loosely held in the said recess to insure accuracy in dropping it at the proper moment.

JAMES R. AYERS.

Witnesses:
W. R. McKENNEY,
ROBERT H. JONES, Jr.